United States Patent [19]
Lowry et al.

[11] Patent Number: 5,970,066
[45] Date of Patent: Oct. 19, 1999

[54] VIRTUAL ETHERNET INTERFACE

[75] Inventors: Gerard P. Lowry, Freehold; Michael J. Pepsin, Middleton, both of N.J.

[73] Assignee: Paradyne Corporation, Largo, Fla.

[21] Appl. No.: 08/873,602

[22] Filed: Jun. 12, 1997

Related U.S. Application Data

[60] Provisional application No. 60/033,836, Dec. 12, 1996.

[51] Int. Cl.[6] .................................................. H04L 12/56
[52] U.S. Cl. ......................... 370/353; 370/420; 370/446
[58] Field of Search ........................ 375/222; 370/352, 370/353, 354, 356, 401, 469, 473, 474, 445, 446, 420, 421, 490, 493, 494, 495, 486

[56] References Cited

U.S. PATENT DOCUMENTS

| | | | |
|---|---|---|---|
| 5,105,438 | 4/1992 | Ackroff et al. | 375/222 |
| 5,504,736 | 4/1996 | Cubbison, Jr. | 370/241 |
| 5,659,684 | 8/1997 | Giovannoni et al. | 395/200.8 |
| 5,732,080 | 3/1998 | Ferguson et al. | 370/392 |
| 5,838,682 | 11/1998 | Dekelbaum et al. | 370/401 |
| 5,841,991 | 11/1998 | Russel | 395/200.51 |
| 5,867,666 | 2/1999 | Harvey | 709/239 |
| 5,894,479 | 4/1999 | Mohammed | 370/401 |

*Primary Examiner*—Chau Nguyen
*Assistant Examiner*—Eva Tang
*Attorney, Agent, or Firm*—Thomas, Kayden, Horstemeyer & Risley, L.L.P.

[57] ABSTRACT

A virtual ethernet interface interconnects a first computer at a customer premise with an ethernet local area network (LAN) at a central office that is connected to the customer premise via a digital subscriber line (DSL). The virtual ethernet interface comprises a virtual interface card connected to the first computer and a physical interface card connected to a second computer that is in communication with the ethernet hub. On start up, the central office computer sends the MAC address associated with the ethernet interface of the physical interface card back to the virtual interface card of the first computer. Thus, the virtual ethernet interface allows the first computer to form ethernet frames using the MAC address of the physical interface card so that it appear as though they were originated from the second computer. Further, the first computer can receive frames taken from the ethernet LAN by the physical interface card and transmitted to the virtual interface card over the DSL link.

13 Claims, 8 Drawing Sheets

VIRTUAL ETHERNET INTERFACE

CROSS REFERENCE TO RELATED APPLICATION

This application claims priority to and the benefit of the filing date of copending provisional application entitled VIRTUAL ETHERNET INTERFACE, assigned Ser. No. 60/033,836, filed Dec. 12, 1996. The above-referenced provisional application is incorporated herein by reference.

FIELD OF THE INVENTION

The present invention generally relates to computer networking, and more particularly, to an interface between a computer and a remotely located local area network (LAN), such as an ethernet LAN.

BACKGROUND OF THE INVENTION

In recent years, technological advancements have continually pushed the limits as to how fast data can be transmitted between two points over twisted pair copper lines. Currently, data transmission rates of 56 kilobits per second (Kbps) are achievable using voice band analog modems commercially available today. For establishing internet protocol (IP) connectivity, these systems use point-to-point protocol (PPP) or serial line internet protocol (SLIP) for transmitting internet protocol (IP) packets over serial lines. In accordance with PPP or SLIP, data is transmitted between two computers via respective modems connected to each of the computers and operating a compatible modulation scheme. In this configuration, each bit of data received by one of the modems causes an interrupt to be generated at the receiving computer in order to notify the computer the bit of information is available for processing.

A relatively new data transmission technology referred to as digital subscriber line (DSL) is capable of providing data transmission rates of 1 to 9 megabits per second (Mbps) over twisted pair copper lines. This technology is particularly attractive, especially with regard to internet service access, in that it instantly increases the transmission rates by two orders of magnitude over the transmission rates currently available over twisted pair copper lines. Furthermore, since twisted pair copper lines have long been used to provide telephone services in the United States and throughout the world, they are already in place, interconnecting most homes and businesses both within the United States and around the world. Other technologies which can presumably provide equal or even greater transmission rates typically require the deployment of a transport medium such as optical fiber, as proposed in fiber-to-the-curb (FTTC) or fiber-to-the-home (FTTH) systems. Such an effort is costly and takes a very long time to implement, particularly in rural areas.

Examples of specific DSL technologies include asymmetric DSL (ADSL), high-bit-rate DSL (HDSL), and rate-adaptive DSL (RADSL). In accordance with DSL technology, one DSL modem is placed at the customer premise and a second DSL modem is placed at the central office of a local exchange carrier. The DSL modem at the central office will most likely be in a modem pool for servicing multiple customers at a time, though each second modem is dedicated to a particular customer, that is, a particular first modem. The maximum data rate achievable in this configuration will depend upon numerous factors such as the wire gauge, noise, cross-talk, distance between the DSL modems, and the type modulation utilized. At the central office, the DSL modems are connected to an access node that provides an interface between the second DSL modem and a local area network (LAN), a wide-area network (WAN), or some other service system for providing services such as internet access, interactive videos, video conferencing, etc. In the interest of brevity, a detailed explanation of DSL technology will not be provided here since DSL technology is known in the art.

However, with the substantial improvement in transmission rates provided by DSL technology, most personal computers in use today are not able to process the amount of data transmitted between two DSL modems without causing a data overflow problem. Consequently, transport protocols other than PPP or SLIP have been proposed for use at the central office in order to connect the customer premise computer(s) to the access node at the central office. For instance, ethernet/IP (hereinafter referred to as ethernet) and asynchronous transfer mode (ATM) are two such transport protocols. These transport protocols provide for packet switching which only generates an interrupt to a host computer at the arrival of each packet rather than at the arrival of each bit of data. This substantially reduces the number of interrupts generated, and thereby, dramatically reduces the processing time taken to process the received data.

In the case of ethernet, a typical configuration comprises one ethernet LAN at the customer premise and another ethernet LAN at the central office.

However, it would be desirable to enable a single computer at the customer premise to access the ethernet LAN at the central office without having to go through an ethernet LAN at the customer premise.

Thus, a heretofore unaddressed need exists in the industry for interfacing a computer at a customer premise with an ethernet LAN at a central office, wherein the customer premise and central office are interconnected by a DSL link.

SUMMARY OF THE INVENTION

The present invention overcomes the inadequacies and deficiencies in the prior art as discussed hereinbefore and as well known in the industry. The present invention provides for a virtual ethernet interface for interconnecting a first computer at a customer premise and an ethernet LAN at a central office via digital subscriber line (DSL) link. By use of the virtual ethernet interface, a computer at the customer premise can assemble an ethernet packet and transmit the ethernet packet over the DSL link from the customer premise to the central office. At the central office, the ethernet packet is placed on the ethernet LAN where it is transmitted to its destination. This substantially reduces the hardware and software requirements previously placed on the customer who is remotely located with respect to the ethernet LAN.

Briefly stated, a virtual ethernet interface in accordance with an aspect of the present invention comprises a virtual interface card connected to a computer at the customer premise and a physical interface card connected to a computer at the central office. Both the virtual interface card and the physical interface card are connected to or provided with DSL modems for communicating across a DSL link interconnecting the customer premise and the central office so as to enable high speed data transmission. Further, the physical interface card includes an ethernet interface that is in communication with an ethernet hub at the central office for interfacing the physical interface card and the ethernet access node, i.e., the ethernet LAN.

The virtual interface card includes a first-in-first-out (FIFO) interface for conducting ethernet packet transfers with the first computer at the customer premise, and a customer premise (CP) controller for encapsulating and decapsulating ethernet packets in link layer framing for transmission over the DSL link. In the preferred embodiment, the link layer framing is high-level data link control protocol (HDLC). Lastly, the virtual interface card includes a DSL modem connected to the CP controller for sending and receiving the HDLC packets to and from the physical interface card over the DSL link.

Accordingly, an ethernet packet is assembled by the protocol stack of the customer premise computer, and is then sent to the virtual interface card via a virtual interface driver configured for the virtual interface card. At the virtual interface card, the packet is stored at the FIFO interface until the DSL modem is ready, at which time, the CP controller encapsulates the ethernet packet in HDLC to produce a link layer packet that is placed on the DSL link and transmitted to the central office. The sequence performed by the virtual interface card when receiving an ethernet packet is substantially the reverse to that described above for sending a packet, and therefore, will not be described herein for purposes of brevity.

The physical interface card includes an ethernet interface for conducting ethernet packet transfers with the ethernet hub, and a central office (CO) controller for encapsulating and decapsulating ethernet packets in link layer framing, much like the customer premise controller. As with the customer premise controller, the link layer framing in the preferred embodiment is HDLC. In addition, the physical interface card includes a FIFO interface that is interconnected to the CO controller and to both the management utility and the simple network management protocol (SNMP) agent of the central office computer. Lastly, the physical interface card includes a DSL modem for sending and receiving HDLC packets to and from the customer premise virtual interface card via the DSL link.

In accordance with a feature of the present invention, at each start-up of the customer premise computer, the central office controller sends the MAC address to the CP controller over the DSL link. The customer premise controller then stores the MAC address in memory associated therewith. Therefore, when the protocol stack of the computer at the customer premise assembles an ethernet packet, it can retrieve the MAC address from the virtual interface card. Thus, the virtual interface card and the physical interface card use the same MAC address.

This simplifies the operation of the virtual interface card by allowing the DSL modem to merely pass the completely formed HDLC frame to the physical interface card which in turn places the ethernet packet on the ethernet access node. Further, this allows the physical interface card to accept frames destined for only the one single MAC address and to pass those packets unmodified to the virtual ethernet card at the customer premise.

In an alternative embodiment, referred to hereafter as the stand alone model, the computer at the customer premise includes a standard ethernet card to which the virtual interface card is connected. Consequently, the FIFO interface of the virtual interface card is replaced with a stand alone ethernet interface for connecting the virtual interface card to the customer ethernet card connected to the customer premise computer. Further, the control information communicated between the customer computer and the virtual interface card is sent over a serial line connected to the CP controller via a serial interface and the computer via a serial port.

In the stand alone model, the MAC address set up is different from the previous embodiment. The ethernet card of the customer computer is factory programmed with a MAC address, which the customer computer obtains for preparing ethernet packets through a driver command of the associated ethernet driver provided with the ethernet card. The virtual interface card learns the MAC address of the customer's ethernet card when the customer computer sends a packet to the virtual interface card for transmission over the DSL link. The virtual interface card then sends the learned MAC address to the CO controller which configures the ethernet interface of the physical interface card to accept this MAC address from the ethernet LAN.

Other features and advantages of the present invention will become apparent to those skilled in the art upon examination of the following drawings and detailed description. All such additional features and advantages are within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating the principals of the present invention. Furthermore, like reference numerals designate corresponding parts throughout the several views.

DETAILED DESCRIPTION OF THE PREFERRED EMBODIMENT

I. Architecture

The following description is of the best presently contemplated mode of carrying out the present invention. This description is not to be taken in a limiting sense, but is made merely for the purpose of describing the general principals of the invention. Consequently, the scope of the invention should be determined by referencing the appended claims.

Figure 1:
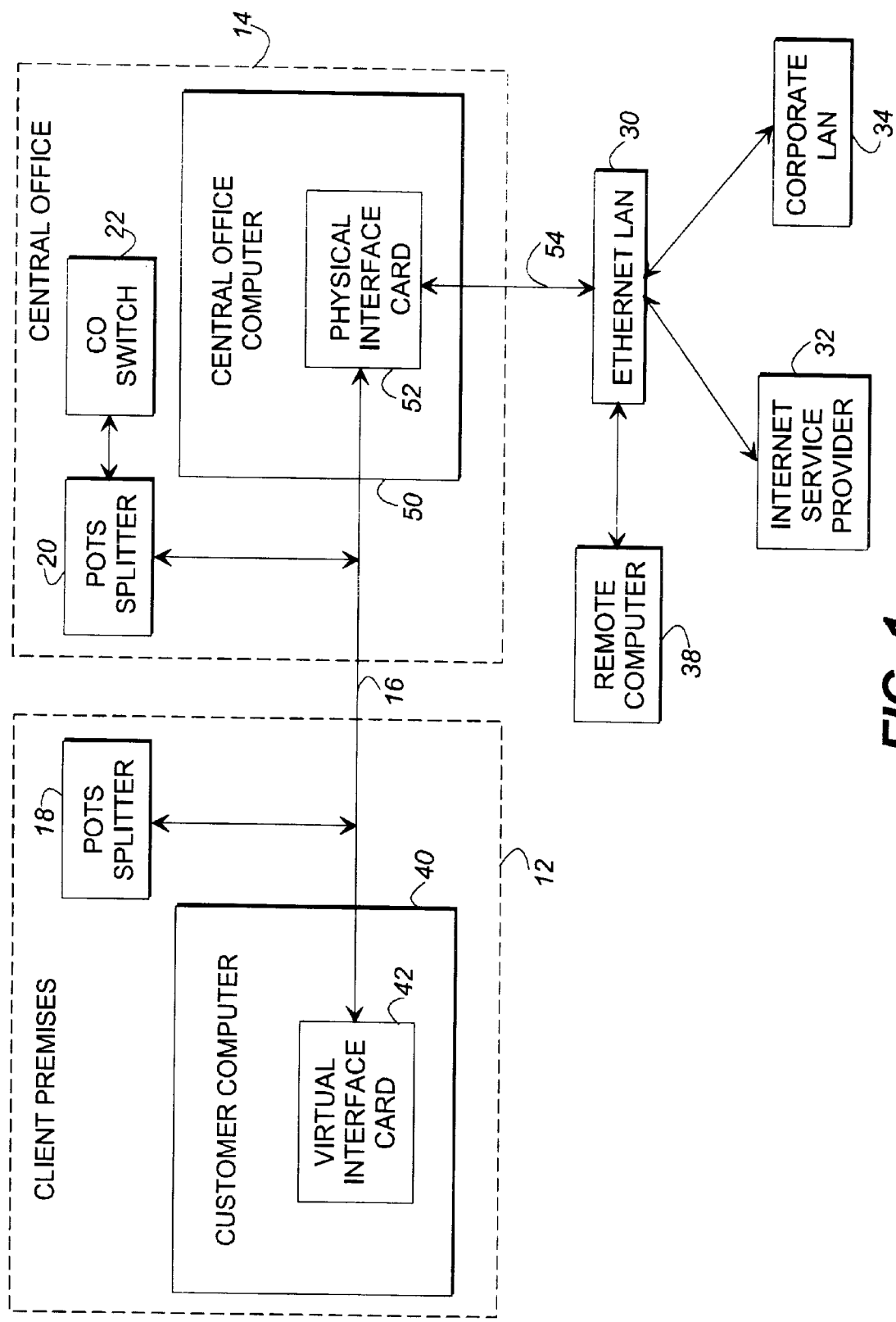
FIG. 1 is a high-level block diagram of a virtual ethernet interface interconnecting a computer at a customer premise with an ethernet LAN at a central office via a digital subscriber line (DSL) link.

With reference to the drawings, FIG. 1 shows a customer premise 12 connected to a central office 14 via digital subscriber line (DSL) link 16. The DSL link 16 may utilize any of the DSL standards such as asymmetric (ADSL), high-bit rate (HDSL) or rate adaptive (RADSL), just to name a few. As is known in the industry, the DSL link 16 is able to support plain old telephone system (POTS) services in addition to DSL transmissions. Therefore, a first POTS splitter 18 can be connected to the DSL link 16 at the customer premise 12 for operating as a low-pass filter for filtering out the DSL signals. Likewise, a second POTS splitter 20 can be connected to the DSL link 16 at the central office 14 for operating as a low-pass filter for filtering out the DSL signals. A central office switch 22 is connected to the POTS splitter 20 for routing calls to and from the customer premise 12.

An ethernet local area network (LAN) 30 is connected to the central office 14. The ethernet LAN 30 functions as an access node for services such as internet access, LAN access, interactive video, or video conferencing. For illustrative purposes, FIG. 1 shows an internet service provider 32 and a corporate LAN 34 connected to the ethernet LAN 30. In addition, a remote computer 38 can also be connected to the ethernet LAN 30 for communicating with any of the above services and/or the customer premise 12.

At the customer premise 12, the DSL link 16 is connected to a customer computer 40 via a virtual interface card 42. The virtual interface card 42 is connected to an internal ISA bus (not shown) of the customer computer 40, as is commonly done. The virtual interface card 42 is seen by the customer computer 40 as a typical ethernet card. Thus, as will be explained in more detail below, when the customer computer 40 desires to send an ethernet packet to the ethernet LAN 30, the customer computer 40 sends an ethernet packet to the virtual interface card 42 which processes the ethernet packet and places it on the DSL link 16 for transmission to the central office 14 where it is placed on the ethernet LAN 30. Likewise, ethernet packets destined for the customer computer 40 are received over DSL link 16 by the virtual interface card 42. The received ethernet packets are then processed and passed on to the customer computer 40.

At the central office 14, the DSL link 16 is connected to a central office computer 50 via a physical interface card 52. As with the virtual interface card 40, the physical interface card 52 is connected to an internal ISA bus (not shown) of the central office computer 50. In addition, the physical interface card 52 is connected to the ethernet LAN 30 via a link 54. Though only one physical interface card 52 is shown connected to the central office computer 50, the central office computer 50 can have a plurality of physical interface cards connected to it, each associated with a respective virtual interface card at a customer premise. The physical interface card 52 receives ethernet packets from the virtual interface card over the DSL link 16 and processes the ethernet packet before sending it to the ethernet LAN 30 over link 54. Ethernet packets sent to the physical interface card 52 from the ethernet LAN 30 are likewise processed by the physical interface card 52 before being sent to the virtual interface card 42 over the DSL link 16.

Therefore, the virtual ethernet interface of the present invention includes a virtual interface card 42 connected to a customer computer 40, a physical interface card 52 connected to a central office computer 50, and a DSL link 16 interconnecting the virtual interface card 40 and the physical interface card 52. In this embodiment, the customer computer 40 recognizes the virtual interface card 42 as any other LAN card with its own specific LAN driver. However, rather than physically interfacing the customer computer 40 with an ethernet LAN at the customer premise, the virtual interface card 42 provides a virtual interface to the remotely located ethernet LAN 30 via the physical interface card 52 and the DSL link 16. The customer computer 40 at the customer premise 12 is therefore able to transmit and receive ethernet packets on the remotely located ethernet LAN 30 via the virtual ethernet interface of the present invention.

Figure 2:
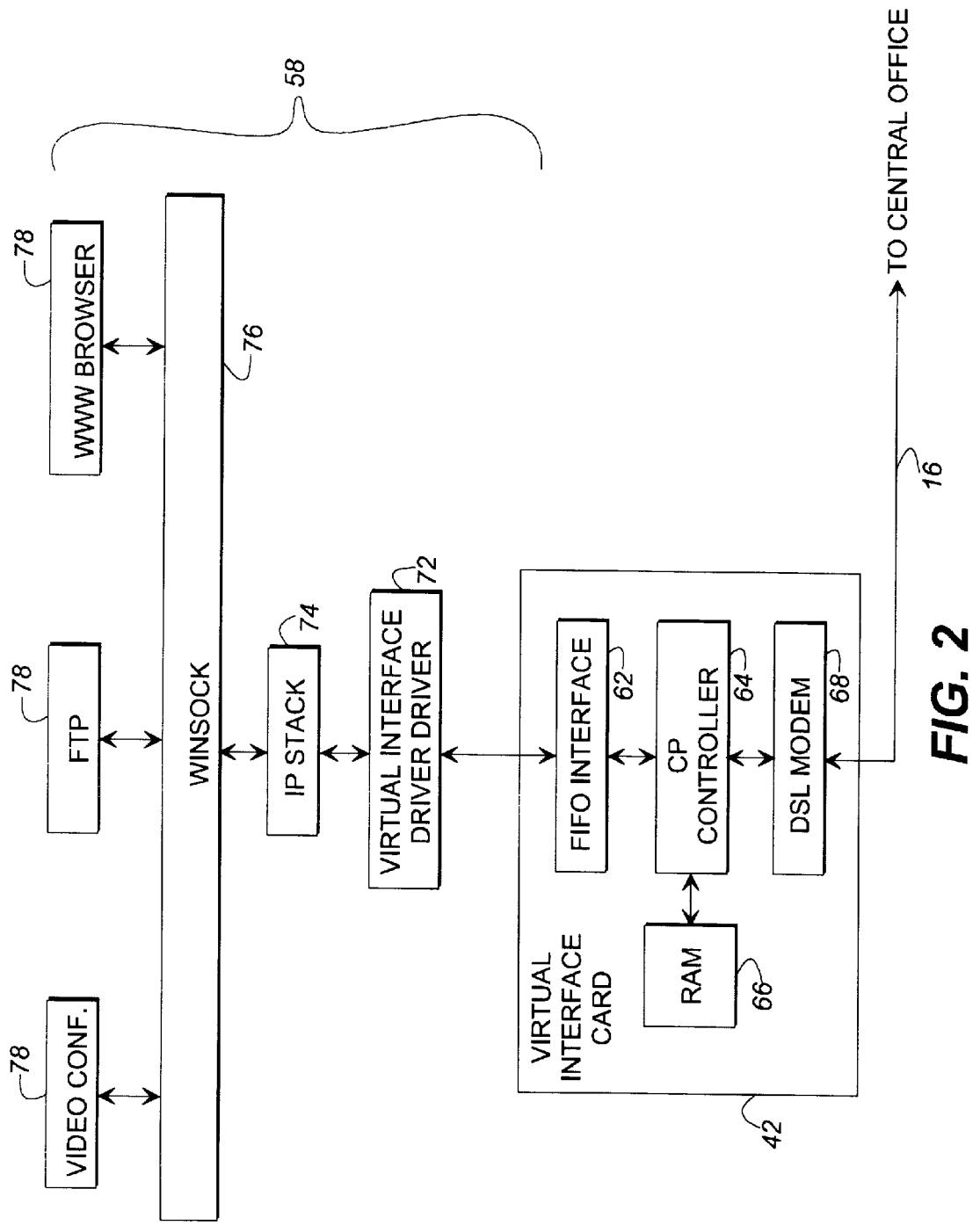
FIG. 2 is block diagram of the computer shown in FIG. 1 which is located at the customer premise, including a virtual interface card in accordance with the present invention.

With reference to FIG. 2, a block diagram is shown illustrating the architecture and functionality of the virtual interface card 42 in conjunction with a protocol stack 58 of the customer computer 40. The virtual interface card 42 includes a first-in-first-out (FIFO) interface 62, a customer premise (CP) controller 64, random access memory 66, and a DSL modem 68. The FIFO interface 62 provides an ISA interface for all data transfers between the virtual interface card 42 and the customer computer 40. The CP controller 64 essentially controls the operation of the virtual interface card 42, including the operations of encapsulating and decapsulating ethernet packets in link layer framing, such as high-level datalink control protocol (HDLC) in the preferred embodiment. The CP controller 64 also performs the function of retrieving the media access control (MAC) address associated with the physical interface card 52 for use by the protocol stack 58 of the customer computer 40, as described in greater detail below. The MAC address, once retrieved from the physical interface card 52 by the CP controller 64, is stored in the RAM 66 associated with the CP controller 64. The DSL modem 68 is essentially a DSL pump for transmitting and receiving packets over the DSL link 16. The DSL modem 68 can be implemented by anyone of the standard transmission type DSL modems such as a DSL, HDSL, or RADSL. It is worth noting at this point that the components of the virtual interface card 42 can be implemented in software, firmware, hardware, or any combination thereof. In the preferred embodiment, the CP controller 64 is implemented as firmware, and the DSL modem 68 is implemented in a combination of software, firmware, and hardware.

The protocol stack 58 of the customer computer 40 includes a virtual interface driver 72, an internet protocol (IP) stack 74, a Windows socket application program interface (API) (referred to hereinafter as winsock) 76, and one or more network applications 78. The virtual interface driver 72 is a software module stored in a memory device and executed by a processor of the customer computer 40 for providing a common interface between the protocol stack 58 of the customer computer 40 and the virtual interface card 42. Examples of suitable drivers for this purpose are Network Driver Interface Specification (NDIS) which is a Microsoft network driver, Open DataLink Interface (ODI) which is a Novel network driver, and Packet which is a network driver. In essence, the virtual interface driver 72 allows the virtual interface card 42 to send decoded packets to the IP stack 74, and the IP stack 74 to send data to the virtual interface card 42 for transmission over the DSL link 16. Thus, the virtual interface driver 72 provides a device-independent interface to the upper layer protocols of the protocol stack 58.

The IP stack 74 performs the network layer functionality of the protocol stack 58, such as packet routing, fragmentation and re-assembly via the datalink layer implemented by the CP controller 64. Of particular interest in the present invention, the IP stack 74 assembles ethernet packets to be sent down the protocol stack for transmission by DSL modem 68 and disassembles ethernet packets for sending information up the protocol stack to the network applications 78. In assembling the ethernet packets, the IP stack 74 retrieves the MAC address from RAM 66 via the virtual interface driver 72.

The winsock 76 is a Windows socket API that provides a single application program interface for allowing multiple network applications 78 to operate in conjunction with the IP stack 74 of the customer computer 42, as is well known in the industry. For purposes of illustrating the present invention, a video conferencing application, a World Wide Web browser application, and a file transfer protocol (FTP) application are provided in FIG. 2 as illustrative of network applications 78 that are IP based so as to be operational with winsock 76.

Figure 3:
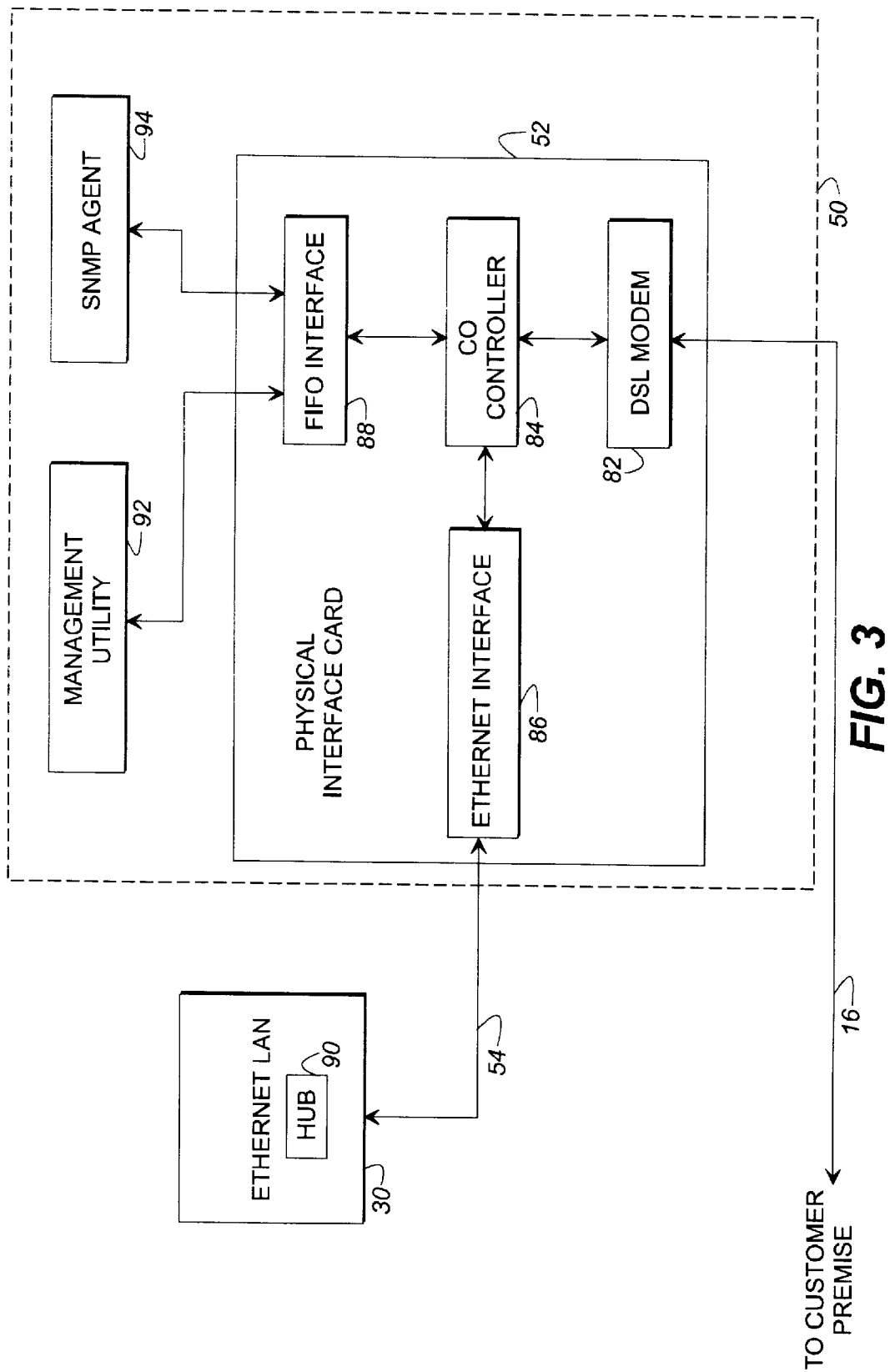
FIG. 3 is a block diagram of the computer shown in FIG. 1 which is located at the central office, including a physical interface card in accordance with the present invention that connects the computer to the ethernet LAN.

With reference to FIG. 3, a block diagram is shown which illustrates the architecture and functionality of the physical interface card 52 in the context of the central office computer 50 and in conjunction with the ethernet LAN 30. The physical interface card 52 includes a DSL modem 82, a central office (CO) controller 84, an ethernet interface 86, and a FIFO interface 88. The DSL modem 82 is connected to the DSL link 16 for transmitting and receiving packets with the DSL modem 68. The DSL modem 82 is substantially similar to and operates in substantially the same manner as the DSL modem 68. The CO controller 84 is connected to DSL modem 82 and is configured to encapsulate and decapsulate ethernet packets in link layer framing. Further, the CO controller 84 provides for one or more different types of packet filtering. For example, in the preferred embodiment, packets received from the ethernet LAN 30 are filtered with an unknown protocol filter, a MAC source filter, and a broadcast filter, and packets destined for the ethernet LAN 30 are filtered by an IP source filter. The unknown protocol filter drops the received packets that are not a supported protocol. The MAC address filter checks the source MAC address of the received packets and compares them to the enabled addresses in the associated unknown protocol filter table. Packets with MAC addresses that do not match are dropped. The broadcast filter drops the received packets unless they are ARP or BOOTP protocol. Lastly, the IP source filter checks the source IP address of the packets being sent to the ethernet LAN 30 and compares them to the enabled addresses in the associated unknown IP source filter table. Packets with IP addresses that do not match are dropped.

The CO controller 84 is also connected to an ethernet hub 90 of the ethernet LAN 30 (FIGS. 1 and 3) via the ethernet interface 86 and a link 54. Lastly, the FIFO interface 88 provides an interface between both a management utility 92 and a simple network management protocol (SNMP) agent 94 of the office computer 50 and the physical interface card 52.

The management utility 92 is a software module for configuring and monitoring the virtual ethernet interface. The management utility 92 is stored on a memory device and is executed by a processor of the central office computer 50. Examples of the configuration options include entering and enabling/disabling MAC and IP filter addresses, enabling and disabling the filters, and setting the data transmission rates for the DSL modems 68, 82. Examples of the status information used to monitor the operation of the virtual ethernet interface include packet and octet counts for the different interfaces, counts of packets with Cyclic Redundancy Checking (CRC) errors detected, the state of the DSL link (i.e., up or down), and how long the link has been up. The management utility 92 also provides for diagnostic features such as loopback and the ability to reset either one of the interface cards 42, 52. In the case of the central office 14, the management utility provides for access to a plurality of physical interface cards (not shown) connected to the central office computer 50.

The SNMP agent 94 provides substantially similar capabilities as the central management utility but over a network using SNMP. The SNMP agent 94 is a software module for interacting with a SNMP manager of a connected network. The SNMP agent 94 is store in the memory device and executed by the processor of the central office computer 50. It should be noted however, that other network management communication protocols other than SNMP can be used in managing the virtual ethernet interface of the present invention.

Figure 4:
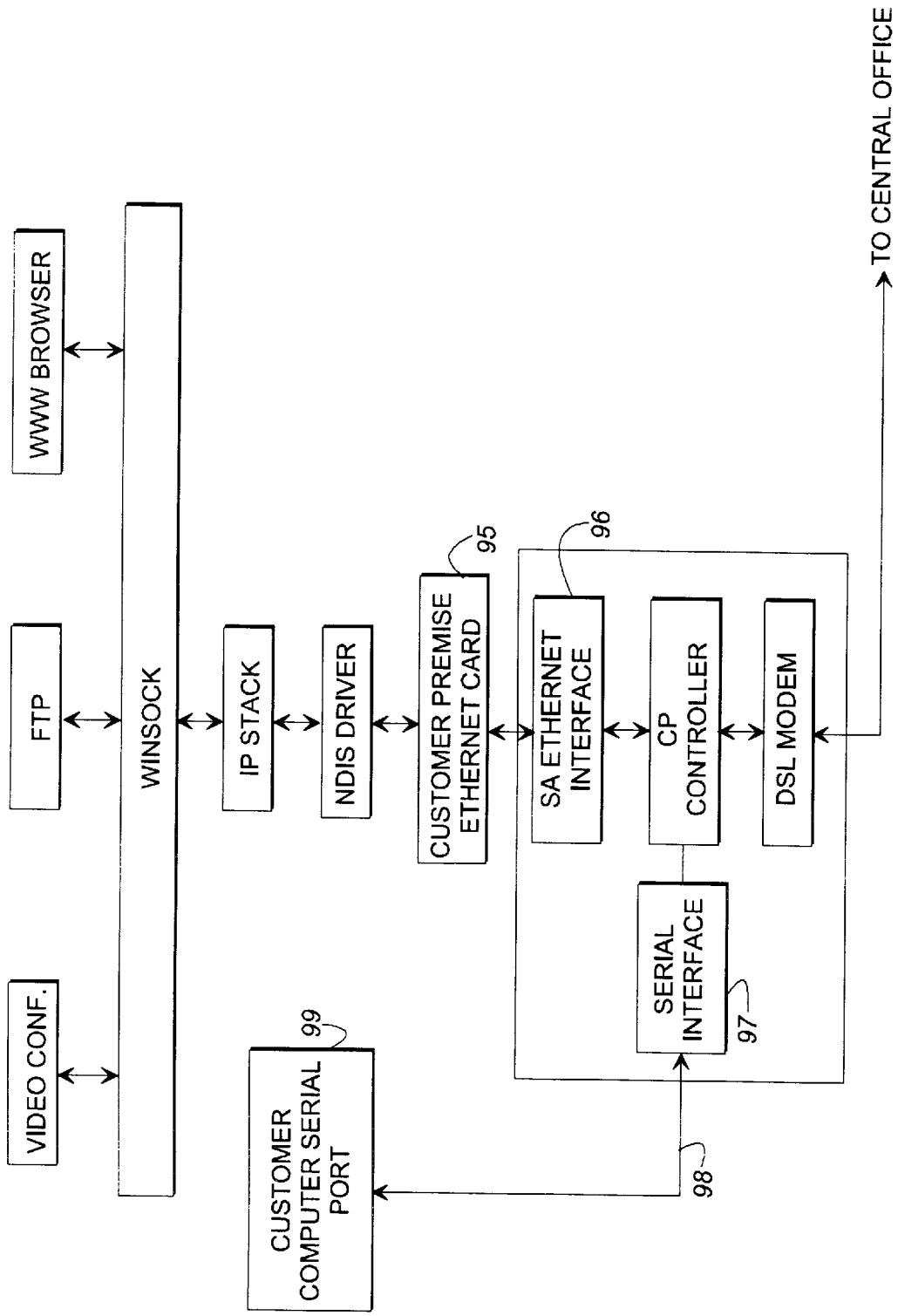
FIG. 4 is a block diagram of the computer shown in FIG. 1 which is located at the customer premise in accordance with the second embodiment of the present invention.

An alternative configuration to the first embodiment described above is a second embodiment referred to as the stand alone model. As illustrated in FIG. 4, in the stand alone model, the customer premise 12 is provided with a 10BaseT ethernet interface via a customer premise (CP) ethernet card 95 connected to the customer computer 40. As illustrated in FIG. 4, the customer premise 12 is configured substantially the same as described above with the exception that the virtual interface card 42 is connected to the CP ethernet card 95 which can be any commercially available ethernet card. In order to connect to the CP ethernet card 95, the FIFO interface 62 (FIG. 2) of the virtual interface card 42 is replaced with a stand alone (SA) ethernet interface 96. In the previous embodiment where the virtual interface card 42 exchanges data and control information with the virtual interface driver 72, only ethernet packets are exchanged across the interface between the CP ethernet card 95 and SA ethernet interface 96 in the stand alone model. The controlling configuration and monitoring information is exchanged between the CP controller 64 and the customer computer 40 via a serial interface 97 connected to a serial port 99 of the customer computer 40 by a serial line 98.

This configuration has several advantages such as the following: (1) installation is made easier because the customer computer 40 will not have to be opened in order to install the virtual interface card 42, (2) the customer computer 40 does not require a full size ISA slot for receiving the virtual interface card 42, and (3) the second embodiment has a layer two interface of the ISO seven layer model and, therefore, the TCP/IP services can be provided to any type of computer or operating system.

As mentioned above, the second embodiment is substantially similar to the first embodiment described above with the exception of the following. With respect to the MAC address configuration in the stand alone model, the ethernet interface 86 (FIG. 3) will learn the MAC address of the CP ethernet card 95 of the customer computer 40 and will send that MAC address to the physical interface card 52. The physical interface card 52 will then configure the ethernet interface 86 to use that MAC address for its physical address recognition. In the stand alone model, the SA ethernet interface 96 at the customer computer 40 is configured to a promiscuous mode and to accept all packets from the customer computer 40. Secondly, with regard to the management utility of the customer computer 40, the stand alone model will have an RS232 serial interface between the customer computer 40 and the virtual interface card 42 for communications between the management utility of the customer computer 40 and the virtual interface card 42. Thus, commands that would otherwise be written to the FIFO interface 62 in the first embodiment, are encapsulated in a SLIP frame and sent out over the serial port 99 onto serial line 98. The virtual interface card 42 will receive the frame and strip off the SLIP encapsulation and handle the command as though it had come to the CP controller 64 from the FIFO interface 62. Similarly, responses to commands will be SLIP encapsulated and transmitted to the customer 40 via the serial interface 97 over the serial line 98.

II. Operation

Figure 5:
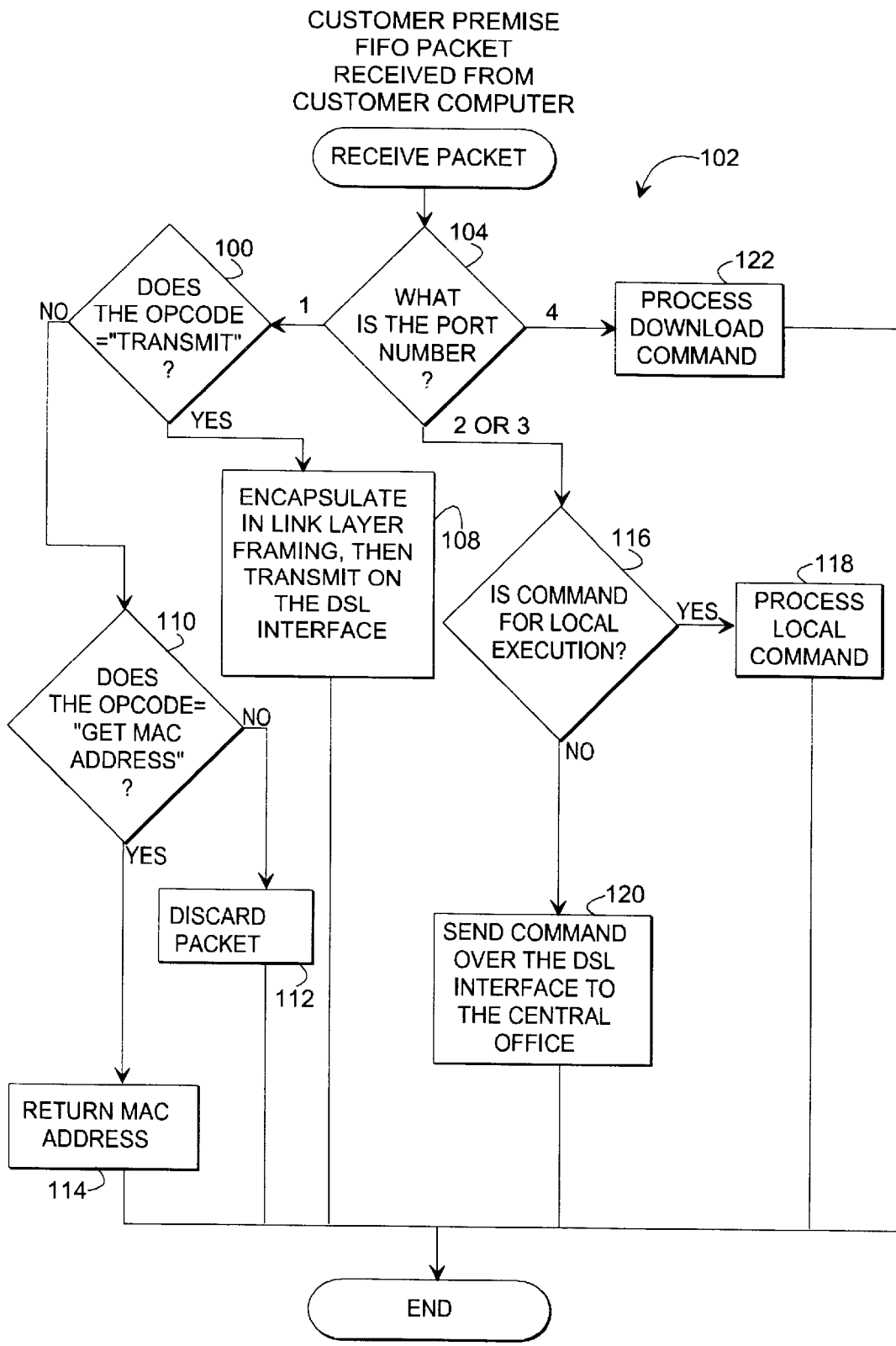
FIG. 5 is a flowchart illustrating the operation of the virtual ethernet interface of the present invention when the virtual interface card receives an ethernet packet from the customer computer.

The preferred operation and sequence of events corresponding with the virtual ethernet interface of the present invention and the associated methodology are described hereafter. With reference to FIG. 5, a flowchart 102 presents the operation at the customer premise 12 when a packet is received by the virtual interface card 42 from the customer computer 40. Initially, the source of the packet is determined at block 104 by checking the port number. As is well known in the industry, the port number is a logical channel identifier in a communication system that is commonly used in an ethernet LAN to demultiplex messages. In a preferred embodiment, the port 1 is associated with set up and communication functions, ports 2 and 3 are associated with administration and maintenance functions at the CO (port 2) and the CP (port 3), and port 4 is associated with the download utility. In general, the data packet could originate from the virtual interface driver 72, the management utility 92, the download utility (not shown), or any other driver types similarly configured. If the port number is 1, indicating that the packet is associated with set up or communication functions originating from the virtual interface driver 72, then it is determined at block 106 whether the operation code associated with the packet is a "transmit" command. If it is, then the packet is encapsulated by the CP controller 64 in link layer framing, and is then transmitted by the DSL modem 68 over the DSL interface 16 to the central office 14, as indicated by block 108.

If the operation code is not a transmit command, then it is determined at block 110 if the operation code is a "get Mac address." If it is not, then the packet is discarded as indicated by block 112. If the operation code is a "get Mac address" command, then the CP controller 64 retrieves the Mac address stored in ram 66 and returns it to the virtual interface driver 72, as indicated by block 114.

If it is determined at block 104 that the port number is 2 or 3, then it is determined at block 116 if the command is directed to the virtual interface card 42. If it is, then the command is processed locally at block 118. Otherwise, the command is intended for the physical interface card 52, and therefore, is sent over the DSL interface 16 to the physical interface card 52 for processing, as indicated by block 120. Lastly, if it is determined at block 104 that the port number is 4, then the packet includes a download command that is processed by the CP controller 64, as indicated by block 122.

Figure 6:
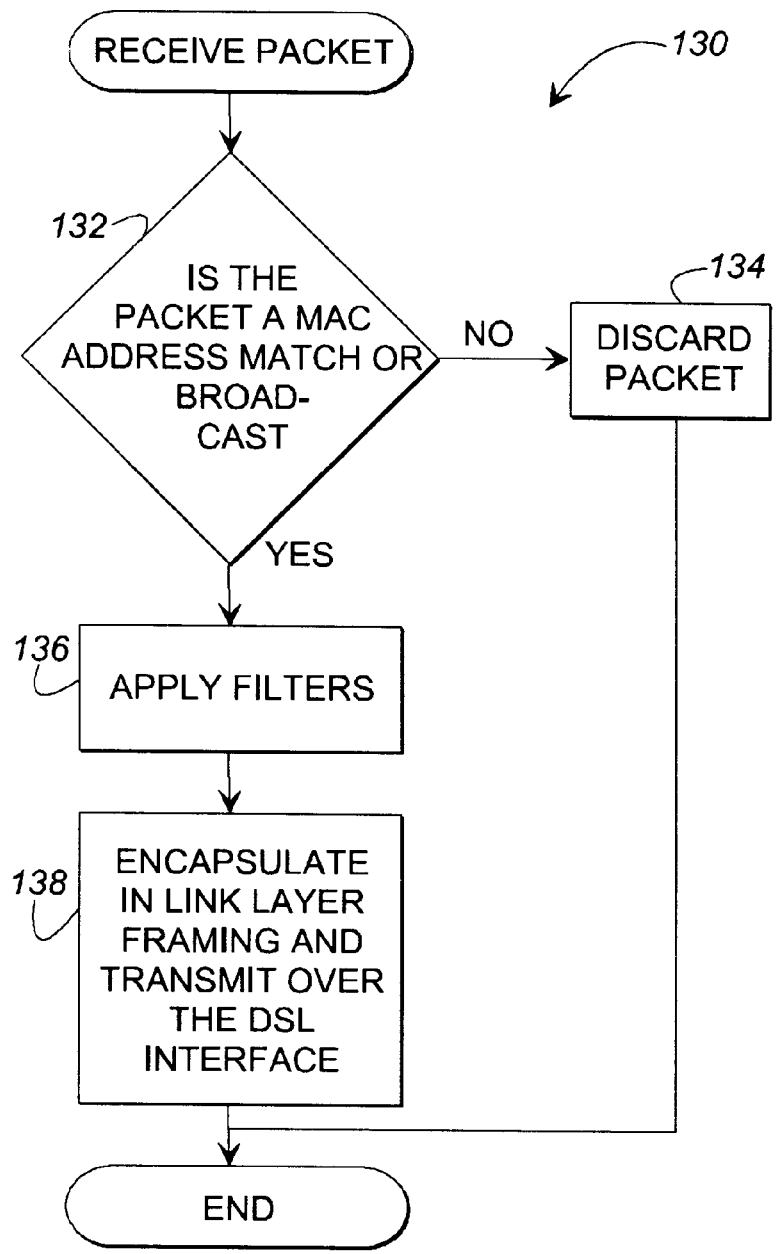
FIG. 6 is a flowchart illustrating the operation of the virtual ethernet interface of the present invention when the physical interface card receives an ethernet packet from the ethernet LAN.

With reference now to FIG. 6, a flowchart 130 illustrates the operation at the central office 14 when an ethernet packet is received by the physical interface card 52 from the ethernet LAN 30. Initially, at block 132, it is determined whether the ethernet packet is a destination Mac address match or a broadcast. This determination is made by the ethernet interface 86 (FIG. 3). If the ethernet packet is neither a Mac address or a broadcast, then the packet is discarded, as indicated by block 134. If the ethernet packet is a Mac address match or a broadcast, as determined at block 132, then various filters can be applied to the packet by the CO controller 84, as indicated by block 136. Such filters may include an unknown protocol filter for dropping packets which are not a supported protocol, a Mac address source filter for determining if the packet has a source Mac address that is enabled in the associated address table, and/or a broadcast filter for dropping packets with broadcast addresses that do not use a particular protocol such as ARP or BOOTP. Once the filters have been applied at block 136, then the packet is encapsulated in link layer framing and transmitted over the DSL interface 16 to the customer premise 12, as indicated by block 138.

Figure 7:
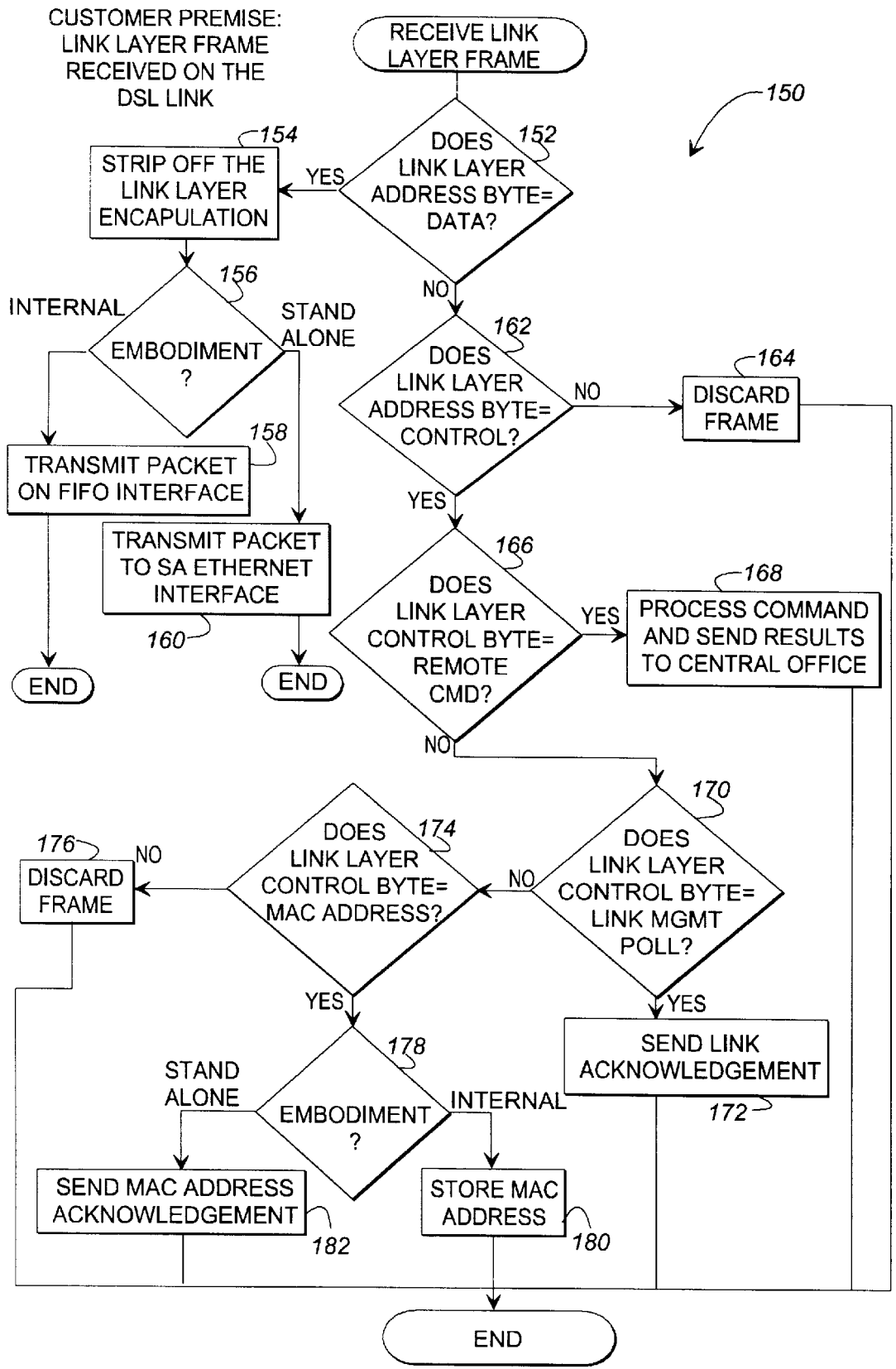
FIG. 7 is a flowchart illustrating the operation of the virtual ethernet interface of the present invention when the virtual interface card receives a link layer frame from the central office over the DSL link.

With reference to FIG. 7, a flowchart 150 illustrates the operation at the customer premise 12 when a link layer frame is received over the DSL link 16. Initially, at block 152, it is determined whether the link layer address bit identifies the frame as containing data. If the frame does contain data, then the link layer framing is stripped off, as indicated by block 154. Once the link layer framing has been stripped off, then the embodiment of the virtual ethernet interface at the customer premise is determined at block 156. Specifically, it is determined at block 156 whether the virtual interface card 42 is installed internally of the customer computer 40 as described above as the first embodiment, or externally of the customer computer 40 as described above as the stand alone or second embodiment. If the virtual interface card is installed internally, then the ethernet packet is transmitted to the FIFO interface 62 at block 158. The ethernet packet will wait at the FIFO interface 62 until it is retrieved by the virtual interface driver 72 for processing by the customer computer 40. If the virtual interface card is installed externally in the stand alone embodiment, then the ethernet packet is transmitted to the SA ethernet interface 96 at block 160. The ethernet packet will wait at the SA ethernet interface 96 until it is retrieved by the customer premise ethernet card 95 for processing by the customer computer 40.

If it is determined at block 152 that the link layer address bit identifies the frame as not containing data, then it is determined at block 162 whether the link layer address bit identifies the frame as containing a control command. If it does not, then the frame is discarded as indicated at block 164. However, if it is determined at block 162 that the received frame contains a control command, then at block 166 it is determined whether the link layer control bit identifies the packet as a remote command. If it is, then the command is processed and the results are sent to the central office 14. If it is not a remote command, then it is determined at block 170 whether the frame is a link management poll. Such poling is typically done between the customer premise 12 and central office 14 in order to determine when the DSL link 16 goes down. If the frame is a link management poll, then a link acknowledgment is sent to the central office 14 at block 172. If the frame is not a link management poll, then at block 174 it is determined whether the control bit identifies the frame as a Mac address. If the frame is not a Mac address, then the frame is discarded at block 176. If the frame is a Mac address, then it is determined at block 178 which embodiment is the customer premise 12, i.e., internal or external. If the customer premise 12 is configured with the virtual interface card installed internally, then the Mac address is stored by the CP control 64 in the associated RAM 66, as indicated by block 180. If the customer premise 12 is configured with the virtual interface card installed externally in the stand alone embodiment, then the CP control 64 sends a Mac address acknowledgment to the physical interface card 52, as indicate by block 182.

Figure 8:
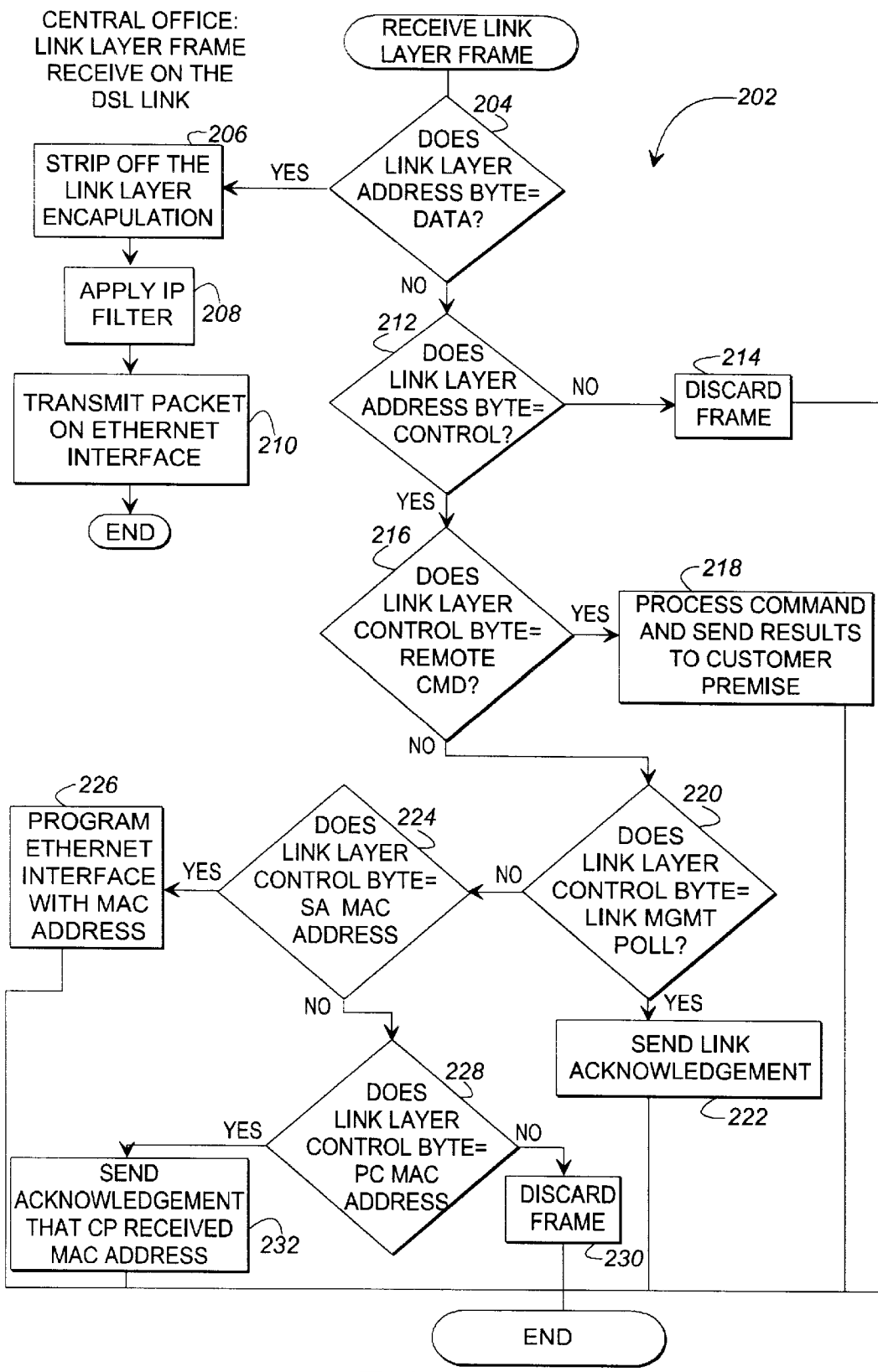
FIG. 8 is a flowchart illustrating the operation of the virtual ethernet interface of the present invention when the physical interface card receives a link layer frame from the customer premise over the DSL link.

With reference now to FIG. 8, a flowchart 202 shows the operation at the central office 14 when a link layer frame is received on the DSL link 16. Initially, at block 204, it is determined whether the link layer address bit indicates the frame as containing data. If the frame contains data, then the link layer framing is stripped off at block 206 and an internet protocol filter is applied by the CO controller 84 at block

208. The internet protocol filter compares the IP address of the frame to the enabled address(es) in the associated table. If the IP address does not match, the packet is dropped. This essentially prevents the user from changing their IP address to that of a different client. Next, at block 210, the packet is transmitted to the ethernet interface 86 which places it on the ethernet LAN 30.

If the link layer bit does not identify the frame as containing data at block 204, then it is determined at block 212 whether the link layer address identifies the frame as containing a control command. If the frame does not contain a control command, then the frame is discarded, as indicated by block 214. If the frame does contain a control command, then it is determined at block 216 whether the link layer control bit identifies the command is a remote command. If it is a remote command, then the command is processed and the results are sent to the customer premise 12, as indicated by block 218. If the command is not a remote command, then it is determined at block 220 whether the control bit identifies the command as a link management poll. If it is, then a link acknowledgment is sent at block 222 to the virtual interface card 42 so as to indicate that the DSL link 16 is not down.

If it is determined at block 220 that the command is not a link management poll, then at block 224 it is determined whether the control bit identifies the frame as including a stand alone (SA) Mac address. If it does, then the ethernet interface 86 is programmed with the Mac address, as indicated at block 226. If it is determined at block 224 that the frame does not include a stand alone Mac address, then it is determined at block 228 whether the control bit is an internal Mac address. If it is not, then the frame is discarded at block 230. If it is an internal Mac address, then an acknowledgment is sent to the central office 14 that the Mac address was received, as indicated by block 232.

It will be apparent to those skilled in the art that many variations and modifications may be made to the embodiments discussed above without departing from the principals of the present invention. All such variations and modifications are within the scope and spirit of the present invention, as set forth in the following claims.

Wherefore, the following is claimed:

1. A virtual Ethernet interface for interconnecting a first computer at a customer premise and an Ethernet hub at a central office that is remotely located with respect to said customer premises via a digital subscriber line (DSL) link, said virtual Ethernet interface comprising:
  a virtual interface card connected to said first computer and in communication with said first computer, said virtual interface card including a first digital subscriber line (DSL) modem for transmitting and receiving Ethernet packets; and
  a physical interface card connected to a second computer and in communication with said Ethernet hub, said physical interface card including a second DSL modem for transmitting and receiving Ethernet packets with said first computer, said DSL link interconnecting said first DSL modem and said second DSL modem for transmitting said Ethernet packets between said first and second DSL modems wherein said virtual interface card and the physical interface card use a common media access control (MAC) address.

2. The virtual Ethernet interface of claim 1, wherein during startup of said first and second modems, said physical interface card sends said MAC address to said virtual interface card.

3. The virtual ethernet interface of claim 2, wherein said virtual interface card includes memory for storing said MAC address sent to said virtual interface card.

4. The virtual Ethernet interface of claim 1, wherein said virtual interface card includes a first-in-first-out (FIFO) interface for conducting Ethernet packet transfers with said first computer, and a customer premises controller for encapsulating and decapsulating Ethernet packets in link layer framing.

5. The virtual ethernet interface of claim 4, wherein said link layer framing is accomplished using a high-level datalink control protocol.

6. The virtual ethernet interface of claim 4, wherein said first computer includes an internet protocol stack in communication with said FIFO interface of said virtual interface card via a driver.

7. The virtual ethernet interface of claim 1, wherein said physical interface card includes an ethernet interface for conducting ethernet packet transfers with said ethernet hub, and a central office controller for encapsulating and decapsulating ethernet packets in link layer framing.

8. The virtual ethernet interface of claim 7, wherein said link layer framing is accomplished using a high-level datalink control protocol.

9. A method of establishing a virtual Ethernet interface for interconnecting a first computer at a customer premises and an Ethernet hub at a central office via a digital subscriber line (DSL) link, said method comprising:
  connecting a virtual interface card to said first computer, said virtual interface card including a first digital subscriber line (DSL) modem for transmitting and receiving Ethernet packets;
  connecting a physical interface card to a second computer that is in communication with said Ethernet hub, said physical interface card including a second DSL modem for transmitting and receiving Ethernet packets with said first computer;
  transmitting Ethernet packets from said virtual interface card to said Ethernet hub via said DSL link interconnecting said first DSL modem and said second DSL modem; and in said first DSL modem, receiving a media access control (MAC) address from said physical interface card, wherein the virtual interface card and the physical interface card use a common media access control (MAC) address.

10. The method of claim 9, further comprising the step of said virtual ethernet interface encapsulating said ethernet packets in link layer framing for transmission on said DSL link to said physical interface card, and for decapsulating link layer framing on said ethernet packets received on said DSL link from said physical interface card.

11. The method of claim 9, wherein said virtual interface card includes memory for storing said MAC address.

12. The method of claim 9, further including the step of said virtual interface card providing said MAC address to said first computer for assembling said Ethernet packet.

13. A virtual Ethernet interface for interconnecting a first computer at a customer premises and an Ethernet hub at a central office that is remotely located with respect to said customer premises via a digital subscriber line (DSL) link, said virtual Ethernet interface comprising:
  a virtual interface card connected to said first computer and in communication with said first computer, said virtual interface card including a first digital subscriber line (DSL) modem for transmitting and receiving Ethernet packets;
  an Ethernet card connected to the virtual interface card via the Ethernet interface, the Ethernet card having a media access control (MAC) address; and a physical interface card connected to a second computer and in communication with said Ethernet hub, said physical interface card including a second DSL modem for transmitting and receiving Ethernet packets with said first computer, said DSL link interconnecting said first DSL modem and said second DSL modem for transmitting said Ethernet packets between said first and second DSL modems, wherein the virtual interface card provides the MAC address to the physical interface card and wherein the physical interface card uses the MAC address when assembling Ethernet packets to be sent to the virtual interface card.

* * * * *